US006352252B1

(12) United States Patent
Schmücker et al.

(10) Patent No.: US 6,352,252 B1
(45) Date of Patent: Mar. 5, 2002

(54) CONVEYOR DEVICE FOR BOOKBINDING MACHINES

(75) Inventors: Christoph Schmücker, Rahden; Ansgar Rohe-Krebeck, Steinfeld-Mühlen, both of (DE)

(73) Assignee: Kolbus GmbH & Co. KG, Rahden (DE)

( * ) Notice: Subject to any disclaimer, the term of this patent is extended or adjusted under 35 U.S.C. 154(b) by 0 days.

(21) Appl. No.: 09/583,498

(22) Filed: May 31, 2000

(30) Foreign Application Priority Data

Jun. 10, 1999 (DE) ........................................ 199 28 407

(51) Int. Cl.[7] .......................... B65G 15/10; B42C 19/08

(52) U.S. Cl. ................................ 270/58.07; 198/836.3; 198/606; 198/626.5; 198/626.3; 198/502.2; 414/789.7; 412/14

(58) Field of Search ........................... 270/58.07, 58.08; 198/626.5, 626.6, 626.3, 464.3, 502.2, 836.6, 606; 414/789.7, 789.9; 412/4, 11, 14

(56) References Cited

U.S. PATENT DOCUMENTS

| | | | | |
|---|---|---|---|---|
| 4,230,218 A | * 10/1980 | Kunzmann | ........... | 198/626.5 X |
| 4,767,250 A | * 8/1988 | Garlichs | ...................... | 412/11 |
| 5,716,190 A | * 2/1998 | Rathert | .................... | 414/794.3 |
| 6,250,868 B1 | * 6/2001 | Schmucker | .................. | 412/25 |
| 6,257,567 B1 | * 7/2001 | Hansmann et al. | ...... | 270/58.07 |

FOREIGN PATENT DOCUMENTS

| | | |
|---|---|---|
| DE | 2428620 C2 | 1/1975 |
| DE | 3603218 A1 | 8/1986 |
| DE | 3613120 C2 | 10/1987 |

* cited by examiner

*Primary Examiner*—Joseph D. Pape
*Assistant Examiner*—Patricia Engle
(74) *Attorney, Agent, or Firm*—Alix, Yale & Ristas, LLP

(57) ABSTRACT

A conveyer device for bookbinding machines having a number of processing stations and having plate or cleated chains or the like which take over book blocks and convey them intermittently to the processing stations. The plate or cleated chains are driven in a circulating manner and have chain beams that act in opposite directions to one another. The chain beams include longitudinal bearers and longitudinal guides on which strands of the plate or cleated chains are supported. In order to shorten the set-up time, the distance of the chain beams of the plate or cleated chains from one another is varied by a setting drive via setting members for the purpose of adapting to different thicknesses of book blocks. The thickness of a particular book block is automatically determined in the setting-up operation via a measuring arrangement in the intake. The thickness is communicated by a memory programmable control system directly to the setting drive as a reference value for the setting members for varying the distance between the chain beams.

4 Claims, 2 Drawing Sheets

CONVEYOR DEVICE FOR BOOKBINDING MACHINES

BACKGROUND OF THE INVENTION

The present invention relates generally to a conveyer device and, more particularly, to a conveyer device for bookbinding machines having a number of processing stations and having plate or cleated chains or the like which take over book blocks and convey them intermittently to the processing stations. The plate or cleated chains are driven in a circulating manner and have chain beams that act in opposing directions to one another and have longitudinal bearers and longitudinal guides on which the strands of the plate or cleated chains are supported.

Bookbinding machines having processing stations for functions such as aligning and preforming, rounding-off and pressing, gluing and gauzing, gluing, book backing and headbanding and the casing of book blocks into book covers, are commonly known. Plate or cleated chains or side-bar chains are used for intermittently conveying the book blocks to the individual processing stations. By way of an example, German Patent Specification 24 28 620 describes a side-bar chain having an endless roller chain which is driven by chain wheels and on the chain pins of which there are located side bars which are mounted in an articulated manner by means of side-bar-holders. The side-bar chains are supported on longitudinal guides by carrying parts which are not illustrated. The distance of the side-bar chains from one another can be adjusted in a manner corresponding to the thickness of the book blocks in order to convey the latter in a straight line in a firmly clamped-in manner.

SUMMARY OF THE INVENTION

An object of the present invention is to provide a conveyer device for bookbinding machines having plate or cleated chains, or similar conveyer means, wherein the distance between the plate or cleated chains or the like automatically adjusts itself to the thickness of the book blocks while providing optimum gripping force and shortening set-up time. The timed positioning stroke of the plate or cleated chains may also be adjustable.

This is achieved in accordance with an embodiment of the invention in a simple and economical manner by varying the distance of the chain beams of the plate or cleated chains from one another through a setting drive via setting members for the purpose of adapting to different thicknesses of book blocks. The thickness of a book block may be automatically determined in the setting up operation during the continuous delivery of the book blocks via a measuring arrangement in the intake. The thickness of a book block is communicated directly to the setting drive as a reference value for the setting members for varying the distance between the chain beams via a memory-programmable control system.

According to a particular embodiment of the present invention, the processing stations are disposed at a defined timed distance from one another which may reflect a particular time based on a particular speed and distance. The plate or cleated chains can be driven intermittently, in a manner corresponding to the time, by a positioning drive having a positioning stroke, and the positioning stroke can be adjusted in a manner corresponding to an elongation of the plate or cleated chains as a result of wear.

BRIEF DESCRIPTION OF THE DRAWINGS

Various embodiments of the present invention are described in greater detail below with the aid of the accompanying drawings, in which.

DETAILED DESCRIPTION OF THE PREFERRED EMBODIMENTS

Figure 1:
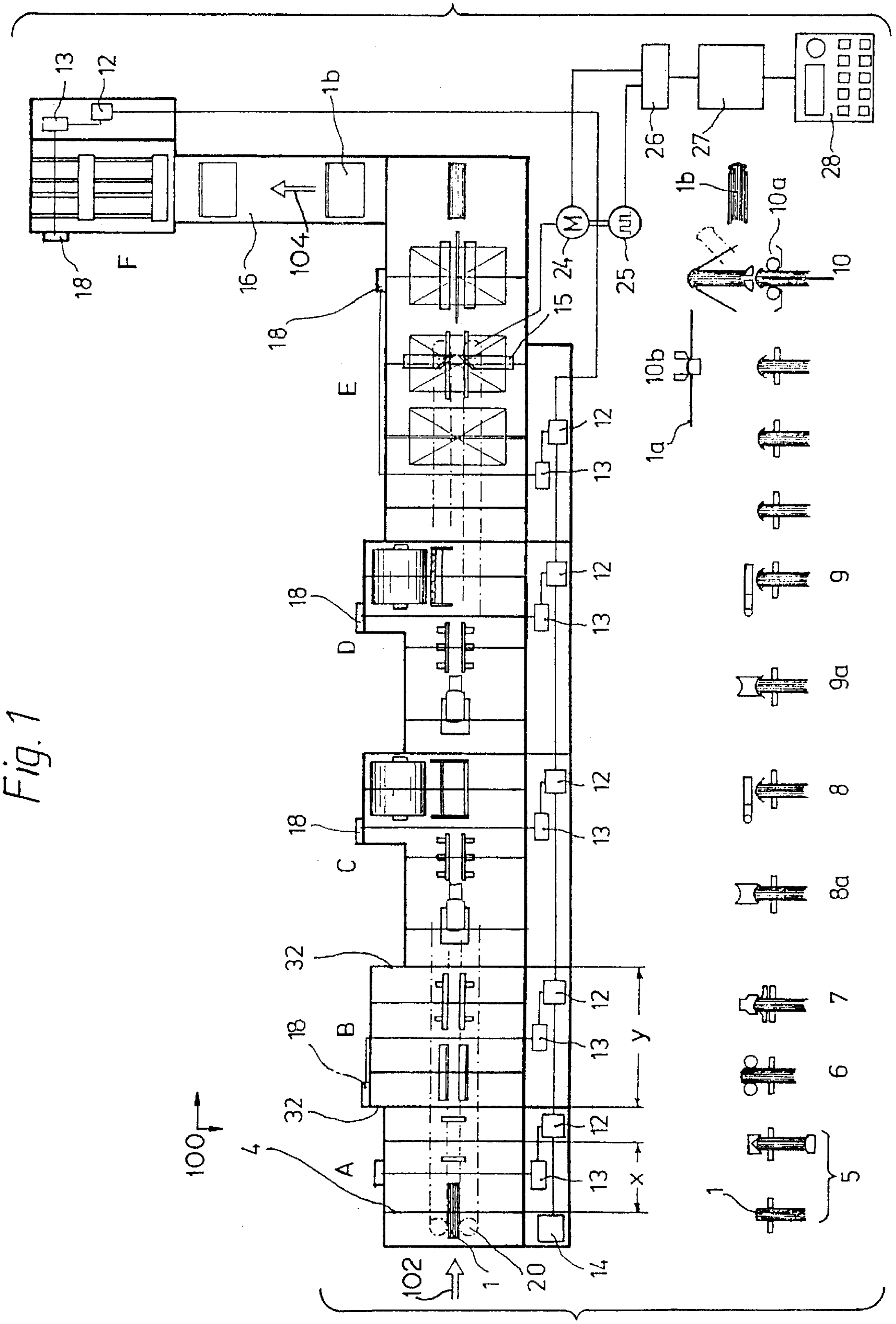
FIG. 1 is a diagrammatical representation of a book-production line in accordance with an embodiment of the present invention.

A book-production line in accordance with an embodiment of the present invention is shown generally at 100 in FIG. 1 and comprises a processing station 5 for performing aligning and preforming functions to the book block 1. Processing stations 6 and 7 perform rounding-off and pressing functions and processing stations **8*a* and 8 are provided for back-gluing and gauzing the book block 1. Processing stations 9*a* and 9 provide the book block with back-gluing and book backing along with headbanding. Processing stations 10, 10*a* and 10*b* perform the functions of forming the casing of the book blocks into book covers. The book-production line 100 also comprises an intake represented by arrow 102 and an outlet represented by arrow 104. The processing stations 5 to 10** are located in individual modules "A" to "E" which can be combined, in a modular fashion, by direct coupling so as to form a book-production line. The book-production line may then be separated by module and combined again in various configurations such as, e.g., in a different order than "A" to "E". Another example of a book production line may be found in U.S. patent application Ser. No. 470,617, entitled "A Book Production Line" and filed on Dec. 22, 1999 which is hereby incorporated herein by reference.

The processing stations from aligning and preforming 5 to book backing and headbanding 9 each comprise one or more defined timed distances "x".

Figure 3:
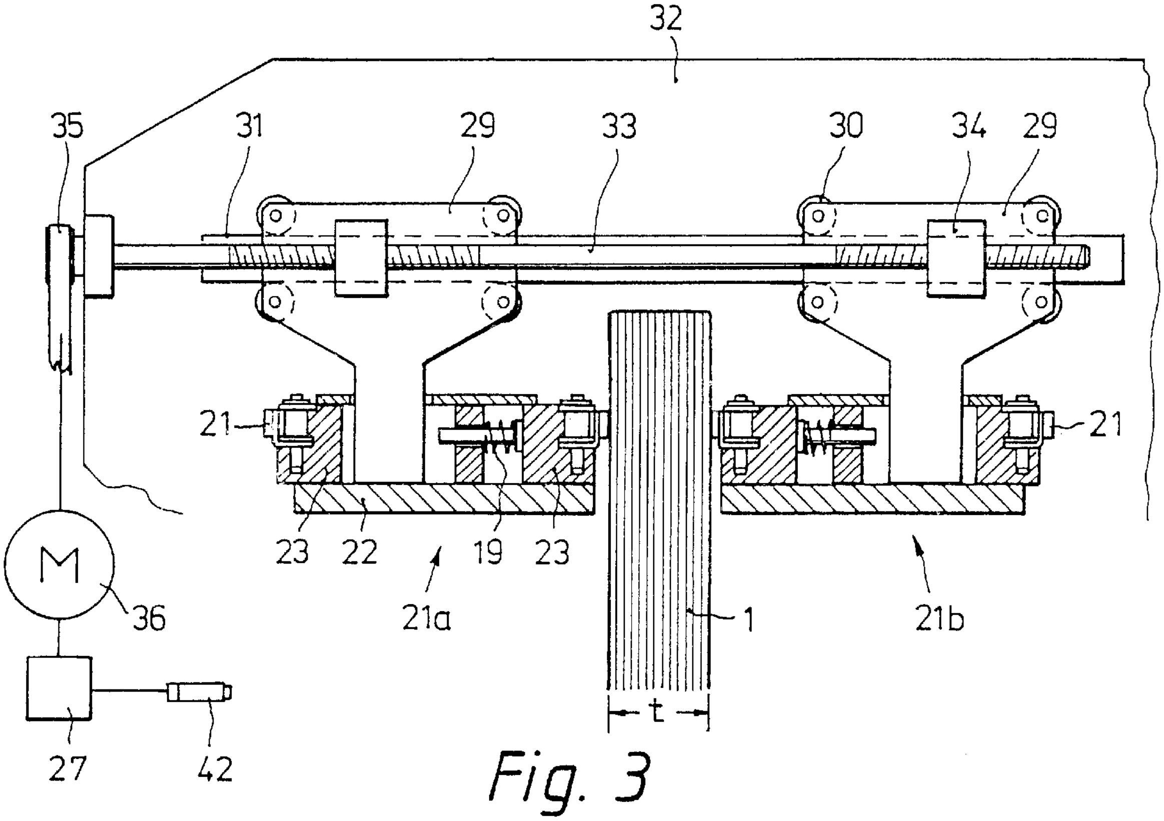
FIG. 3 is an enlarged cross-sectional view of a conveyer device of the bookbinding machine in accordance with the embodiment of FIG. 1.

Referring now also to FIG. 3, the processing stations convey book blocks 1 via a universal conveyer device 20 having endless plate or cleated chains 21 that are driven in a circulating manner. The plate or cleated chains 21 comprise chain beams **21*a* and 21*b*, longitudinal bearers 22, and longitudinal guides 23 on which the strands (not numbered) of the plate or cleated chains are supported via spring elements 19. The foregoing apparatus functions to retain the book blocks 1** in a gripped manner and convey them from the intake to the individual processing stations "A" to "D", in a position aligned with a center of the height of each of the book blocks. It will be appreciated that the height of a book block may be measured as the distance between a head (non-folded edge) and a foot (another non-folded edge) of the book block.

The book blocks 1 are conveyed as far as the casing-in processing station "E", where they are taken over by a connecting conveyer 15 and cased-in after the feeding-in of a book cover **1*a* which is rounded at its back. The books 1*b* pass, via an outlet and a further conveyer 16**, into a compression-forming station "F" as a further individual module.

The individual modules "A" to "E" have the modular dimension "y" which is a multiple of the timed distance "x" and which corresponds to multiples of the chain pitch of the conveyer device 20.

The plate or cleated chains 21 of the conveyer device 20 are driven intermittently, in a manner corresponding to the timed distance "x", by a positioning drive consisting of a servo motor 24 with a resolver 25 and a servo regulator 26. In accordance with an embodiment of the invention, by changing the scheduled angle in accordance with the resolver 25, positional divergences of the book blocks 1 that arise in the individual modules in the event of elongation of the plate or cleated chains 21 may be offset. Positional divergences of the book blocks 1 may be identified by the fact that the positioning stroke of the elongated plate or cleated chains 21 varies with respect to the dimension "x". The positional divergences may be corrected via the control system 27 by input from the control panel 28 of the book-production line.

The chain beams 21*a* and 21*b* of the conveyer device 20 act on opposed sides of a book block 1 and are divided up in a manner corresponding to the modular dimension "y" of the individual modules. The distance between the chain beams 21*a* and 21*b* and can be varied via motor-operated shifting systems for the purpose of adapting to different thicknesses (t) of the book blocks 1. To this end, the chain beams 21*a* and 21*b* are received, at the ends, by carriages 29 having running rollers 30 and are displaceable on guide rails 31 on mutually opposed walls 32 of the stand. The chain beams 21*a* and 21*b* are moved via shifting spindle 33 having right-hand and left-hand threads acting on bearing blocks 34 mounted to the carriages 29. The spindle 33 may be rotated by a toothed-belt drive 35 operated by a motor or drive 36 coupled to the control system 27.

Figure 2:
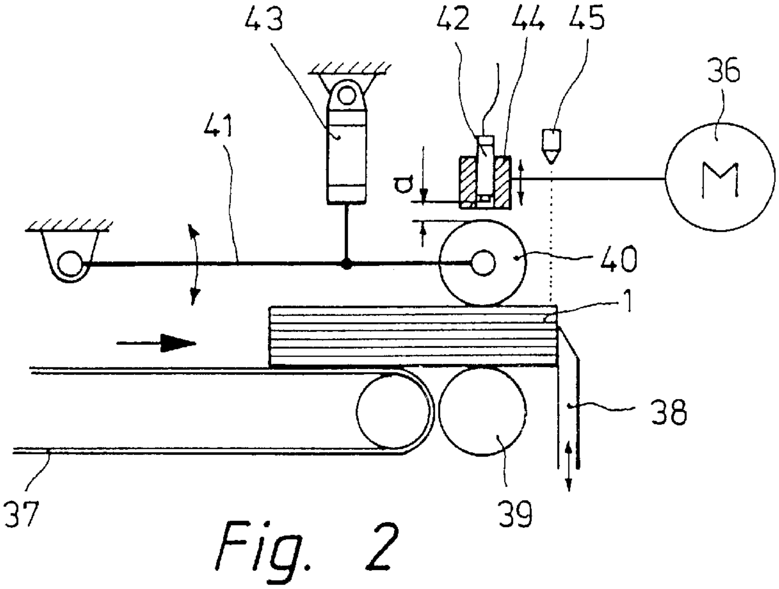
FIG. 2 is a schematical representation illustrating a measuring arrangement for adjusting a conveyer device in accordance with the embodiment of FIG. 1.

In accordance with a feature of the invention, the shifting of the chain beams 21*a* and 21*b* takes place, in a manner corresponding to the thickness of a book block 1, by automatic location in the setting-up operation of the book-production line via an inductive path-measurement in the feed. Referring now also to FIG. 2, a book block 1 that is lying flat comes, via a feed band 37, into abutment against an intake barrier 38. In the illustrated embodiment, measuring the thickness may be accomplished by use of a feeler roll 40 that interacts with a support roll 39. An inductive pick-up 42 may be positioned in the stop 44 for the feeler roll 40 which measures the distance "a" to the feeler roll and outputs an analog signal which is fed to the control system 27. The control system 27 may then provide for appropriate shift of the chain beams 21*a* and 21*b* according to the distance "a" via the setting drive (e.g. toothed-belt drive 35, drive 36) and the setting members (e.g. carriage 29, spindle 33). The feeler roll 40 is lowered with a defined contact pressure via a pneumatic cylinder 43 adjacent the book block 1 and the inductive pick-up 42 is delivered to the feeler roll 40 via the drive 36 until the reference value for the distance "a" is reached. The feeler roll 40 and chain beams 21*a* and 21*b* are thus adjusted to the thickness of the book block.

In addition, the measuring arrangement serves as a system for monitoring the thickness of book blocks 1 running in during the production operation of the book-production line. Controlled by a light barrier 45, the pneumatic cylinder 43 lowers the feeler roll 40 out of its contact position with the stop 44 and onto the book blocks 1 which have been moved against the intake barrier 38. The inductive pick-up 42 determines the distance "a" to the feeler roll 40 in each case, and the control system 27 compares the measured value with the reference value determined in the setting-up operation. If a book block 1 is detected to be outside a defined tolerance range, no release by the intake barrier 38 occurs and the book block is not subject to further processing. However, book blocks 1 that are determined to be within the tolerance range are released by the intake barrier 38 in response to a control pulse and transported onwards into the book-production line via the feeler roll 40, driven in an accelerated manner, and the support roll 39.

While the present invention has been described in connection with what is presently considered to be the most practical and preferred embodiments, it is to be understood that the present invention is not limited to the disclosed embodiments. Rather, it is intended to cover all of the various modifications and equivalent arrangements included within the spirit and scope of the appended claims.

What is claimed is:

1. A conveyer device for bookbinding machines having a number of processing stations for processing book blocks and an intake, comprising:

plate or cleated chains for supporting and conveying the book blocks intermittently throughout the processing stations, the plate or cleated chains being driven in a circulating manner;

chain beams engageable with the plate or cleated chains, the chain beams acting in opposed directions to one another and having longitudinal bearers and longitudinal guides on which the strands of the plate or cleated chains are supported;

a setting drive having setting members for varying the distance of the chain beams of the plate or cleated chains from one another for adapting to various thicknesses of book blocks;

a measuring arrangement for determining a thickness of a book block in the setting-up operation located in the intake; and a memory-programmable control system for communicating the thickness to the setting drive as a reference value for the setting members for varying the distance between the chain beams.

2. The conveyer device as claimed in claim 1, wherein the measuring arrangement comprises:

a feeler roll controlled by a working cylinder, the feeler roll acting with a predefined contact pressure on the surface of a book block;

a feed conveyer for positioning the book block against an intake barrier and a support; and an inductive pick-up for generating a signal communicated to the control system for controlling the setting drive.

3. The conveyer device as claimed in claim 2, wherein the thickness of the book blocks transported by the feed conveyer against the intake barrier is determined during production operation via the measuring arrangement and, in the event of conformity within a predefined tolerance range of the reference value determined, a control pulse for moving the intake barrier and releasing the book blocks and transporting them onwards is triggered.

4. The conveyer device as claimed in claim 1, wherein the processing stations are disposed at a predefined timed distance (x) from one another and further comprising:

a positioning drive for driving the plate or cleated chains intermittently over the timed distance (x), the positioning drive having a positioning stroke that is adjustable to correct for elongation of at least one of the plate or cleated chains.

* * * * *

UNITED STATES PATENT AND TRADEMARK OFFICE

CERTIFICATE OF CORRECTION

PATENT NO. : 6,352,252 B1
DATED : March 5, 2002
INVENTOR(S) : Schmücker et al.

It is certified that error appears in the above-identified patent and that said Letters Patent is hereby corrected as shown below:

Title page,
Item [30], delete "199 28 407" and insert -- 199 26 407 --.

Signed and Sealed this

Eighteenth Day of February, 2003

JAMES E. ROGAN
*Director of the United States Patent and Trademark Office*